US011261006B2

(12) United States Patent
Kennedy

(10) Patent No.: US 11,261,006 B2
(45) Date of Patent: Mar. 1, 2022

(54) CONTAINER ORGANIZER

(71) Applicant: Thomas Michael Kennedy, Ann Arbor, MI (US)

(72) Inventor: Thomas Michael Kennedy, Ann Arbor, MI (US)

(*) Notice: Subject to any disclaimer, the term of this patent is extended or adjusted under 35 U.S.C. 154(b) by 0 days.

(21) Appl. No.: 16/819,020

(22) Filed: Mar. 13, 2020

(65) Prior Publication Data

US 2020/0290770 A1 Sep. 17, 2020

Related U.S. Application Data

(60) Provisional application No. 62/817,810, filed on Mar. 13, 2019.

(51) Int. Cl.
| | |
|---|---|
| *B65D 25/04* | (2006.01) |
| *B65D 43/16* | (2006.01) |
| *A47B 46/00* | (2006.01) |
| *A47B 96/04* | (2006.01) |

(52) U.S. Cl.
CPC ............ *B65D 25/04* (2013.01); *A47B 46/005* (2013.01); *A47B 96/04* (2013.01); *B65D 43/16* (2013.01)

(58) Field of Classification Search
CPC ...... B65D 25/04; B65D 43/16; A47B 46/005; A47B 96/04; A47B 2088/976; A47B 88/00; A47B 88/90; A47B 88/969; A47B 96/16; A47B 97/08; A47J 47/02; A47J 47/16; A47F 7/0057
See application file for complete search history.

(56) References Cited

U.S. PATENT DOCUMENTS

| | | | | |
|---|---|---|---|---|
| 3,251,636 A | * | 5/1966 | Hein | A47F 1/04 312/122 |
| 3,272,580 A | * | 9/1966 | Dean | A47B 63/02 312/409 |
| 4,303,158 A | * | 12/1981 | Perkins | B25H 3/02 206/373 |
| 4,550,934 A | * | 11/1985 | Goossen | B42F 21/02 283/35 |
| 4,577,914 A | | 3/1986 | Stravitz | |
| 4,659,154 A | * | 4/1987 | Jenkins | A01K 97/26 269/907 |
| 4,846,346 A | * | 7/1989 | Kime | A45C 5/00 206/372 |

(Continued)

OTHER PUBLICATIONS

YouTube Video Titled "Mr. Lid—As Seen on TV Chat," uploaded on Mar. 18, 2013 by user asseenontvchat, webpage <https://www.youtube.com/watchv=DSmMBGGDsaw feature=youtu.be>.

*Primary Examiner* — Ko H Chan
(74) *Attorney, Agent, or Firm* — Howard & Howard Attorneys PLLC

(57) ABSTRACT

Container organizers, kits, and methods for organizing a plurality of storage containers including dishes and lids. A rack includes a base defining a cavity for storing container lids and defining first and second openings providing access to the cavity. The first and second openings are noncoplanar, and the container lids are received by and removed from the cavity through the first and second openings. The rack also includes a cap moveably coupled to the base between a first position in which the cap covers the second opening and a second position in which the cap is separated from the second opening.

19 Claims, 16 Drawing Sheets

(56) References Cited

U.S. PATENT DOCUMENTS

| | | | |
|---|---|---|---|
| 5,000,326 A * | 3/1991 | Vaughn | A47F 7/0064 |
| | | | 211/41.11 |
| 5,207,334 A | 5/1993 | Lear | |
| 5,244,265 A * | 9/1993 | Chiang | B25H 3/023 |
| | | | 312/107 |
| 5,324,105 A * | 6/1994 | Christensen | A47F 7/0057 |
| | | | 206/303 |
| 5,683,157 A * | 11/1997 | Peterson | A47J 33/00 |
| | | | 312/100 |
| 6,550,792 B1 * | 4/2003 | Salmon | B62B 1/02 |
| | | | 248/129 |
| 7,918,361 B2 | 4/2011 | Geis | |
| 9,629,505 B2 * | 4/2017 | Johnson | A47F 7/281 |
| 9,844,264 B1 * | 12/2017 | Stewart, III | A47B 96/021 |
| 2004/0140274 A1 | 7/2004 | Turvey et al. | |
| 2006/0283854 A1 | 12/2006 | Kim | |
| 2007/0272092 A1 | 11/2007 | Ehrenreich | |

* cited by examiner

CONTAINER ORGANIZER

TECHNICAL FIELD

The present invention relates to container organizers for organizing storage containers.

BACKGROUND

Storage containers are a well known and useful tool within households. Storage containers are typically used for storing food and produce, but are very versatile in nature and can be used for storing any kind of article having a suitable size and configuration. Typically, storage containers are stored within cupboards and drawers. Over time, multitudes of storage containers having various configurations are gathered and placed in the cupboards and drawers. The storage containers are cumbersome and quickly fill the cupboards and drawers. Further, various configurations are often not stackable and result in a cluttered and unstable assortment of storage containers. It is not uncommon for unstable storage containers to fall out of the cupboard when opened or for a drawer to not shut properly as the drawer jams against a pile of unorganized storage containers within the drawer.

There is a desire within the storage container industry to organize the clutter that is often associated with the storage containers. Stackable and interlocking dishes and lids have been designed to help organize the clutter. However, different configurations of storage containers do not always stack together. Therefore, there remains a desire within the industry for a container organizer kit having storage containers and a rack that organizes and allows easy accessibility to the storage containers.

SUMMARY

In one example, a container organizer kit includes a plurality of storage containers and a rack for organizing the storage containers. The storage containers include at least one dish and at least one lid with the lid capable of coupling to the dish for storing and sealing an article within. The lids and the dishes have various sizes and configurations for the containers. The rack includes a base and a cap with the base defining a first cavity and the cap defining a second cavity. The first and second cavities are configured to accept the various sizes and configurations of lids. The cap includes an upper surface upon which the various sizes and configurations of dishes are stacked. The cap advantageously has a hinged coupling to the rack. The hinged coupling of the cap to the rack allows multiple points of access to the lid depending on the location of the container organizer kit.

In another example, a container organizer includes a base defining a cavity for storing first container lids and first and second openings providing access to the cavity. The first and second openings are noncoplanar, and the first container lids are received by and removed from the cavity through the first and second openings. The container organizer also includes a cap moveably coupled to the base between a first position in which the cap covers the second opening and a second position in which the cap is separated from the second opening.

In a further example, a container organizer kit includes first container lids, second container lids larger than the first container lids; and a container organizer. The container organizer includes a base portion defining a first cavity for storing the first container lids and a first opening providing access to the first cavity. The first container lids are received by and removed from the first cavity through the first opening. The base portion also includes vertical dividers disposed within the first cavity that hold the first container lids in a vertical orientation. The container organizer further includes a cap portion positioned above the base portion. The cap portion defines a second cavity for storing the second container lids and a second opening coplanar with the first opening and providing access to the second cavity. The second container lids being received by and removed from the second cavity through the second opening. The cap portion also includes horizontal dividers that hold the second container lids in a horizontal orientation. The cap portion and the base portion define a third cavity that includes the first cavity and the second cavity.

In an additional example, a method of using a container organizer having a base defining a first cavity for storing first container lids and defining first and second openings providing access to the first cavity, with the first and second openings being noncoplanar, and having a cap coupled to the base, includes the steps of inserting one of the first container lids into the first cavity through the first opening when the cap is in a first position in which the cap covers the second opening, opening a drawer, and placing the container organizer having the one of the first container lids in the first cavity in the drawer so that the first opening faces laterally and the cap faces upwards. The method also includes the steps of moving the cap from the first position to a second position in which the cap is coupled to the base and separated from second opening while the container organizer is in the drawer, retrieving the one of the first container lids from the first cavity through the second opening when the cap is in the second position while the container organizer is in the drawer, moving the cap from the second position to the first position, and closing the drawer.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
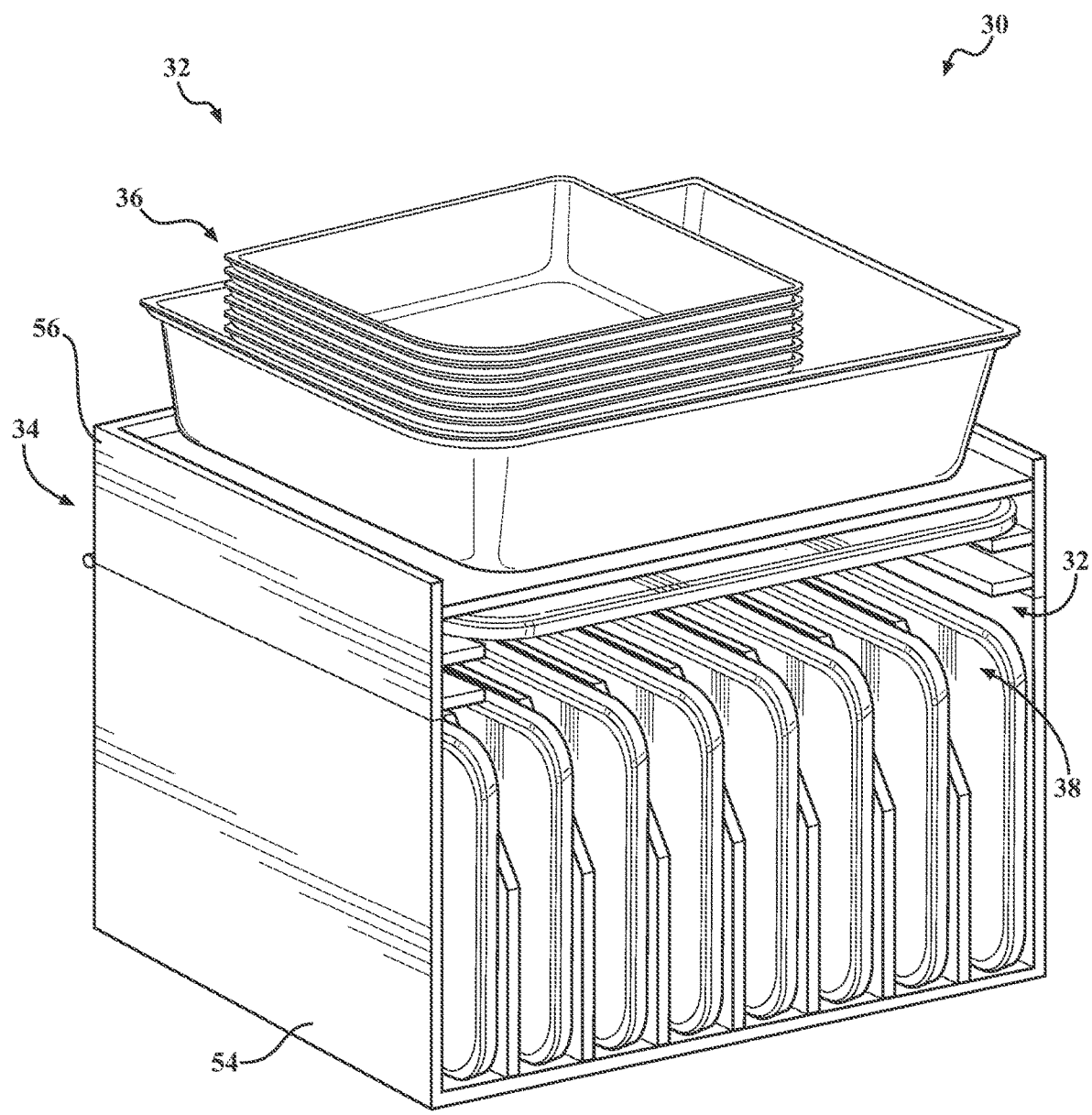
FIG. 1 is a perspective view of a container organizer kit.

Referring to the Figures, wherein like numerals indicate like parts throughout the several views, a container organizer kit 30 is shown in FIG. 1. The container organizer kit 30 includes a plurality of storage containers 32 and a rack 34 (also referred to herein as a "container organizer") for organizing the storage containers 32. Typically, the container organizer kit 30 is disposed within a cupboard (not shown) or a drawer (not shown) of a home (not shown). However, it is to be appreciated that the container organizer kit 30 can be used in any other configuration without departing from the scope of the present invention.

Figure 2:
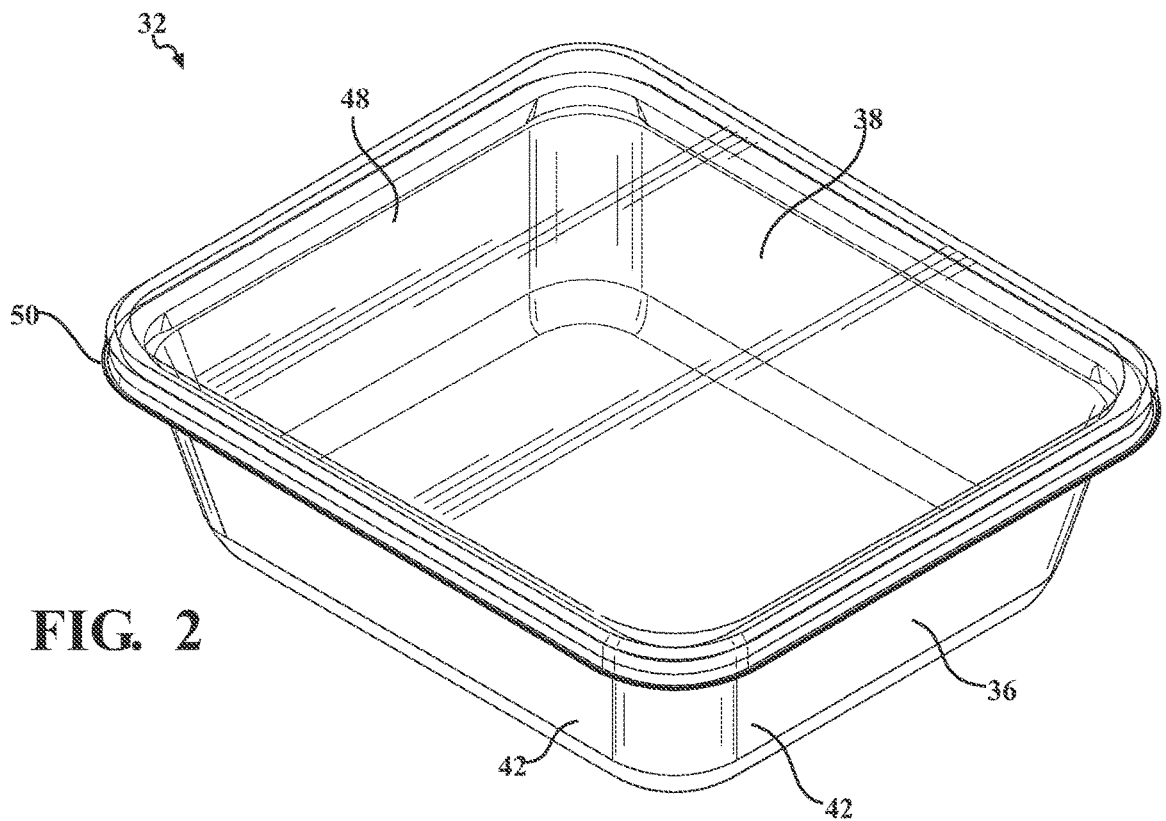
FIG. 2 is a perspective view of a storage container.

Each of the storage containers 32 include at least one dish 36 and at least one lid 38 with the lid 38 capable of coupling to the dish 36 for storing and sealing an article (not shown) within, as shown in FIG. 2. In the exemplary embodiment, the at least one dish is a plurality of dishes 36 and the at least one lid 38 is a plurality of lids 38. Typically, the article is a food item or produce, with the lid 38 and the dish 36 acting to both contain the article within the storage container 32 as well as protect the article from contamination by an outside source such as microbes, insects, etc.

Figure 3:
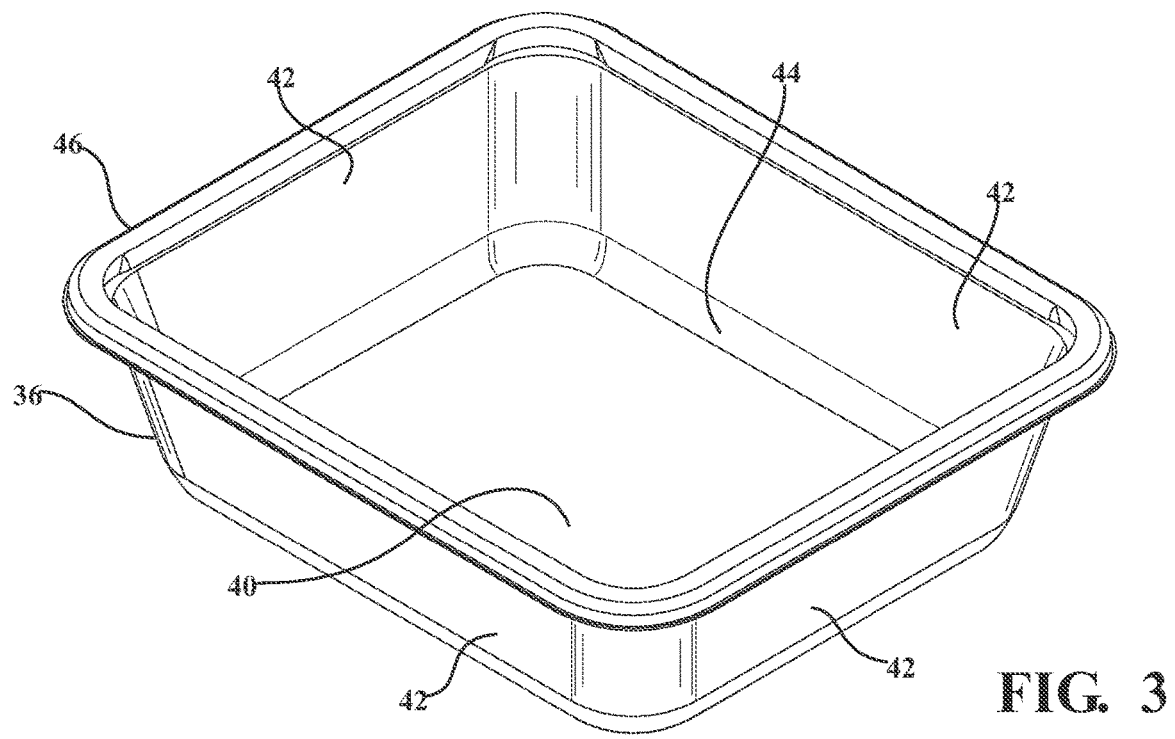
FIG. 3 is a perspective view of a dish.

The dish 36 is configured for holding the article within. As shown in FIG. 3, the dish 36 has a bottom portion 40 and a plurality of walls 42 extending from the bottom portion 40 with bottom portion 40 and the plurality of walls 42 defining an interior 44 for holding the article within. The walls 42 extend to distal ends. A lip 46 extends from each of the distal ends of the walls 42. The lip 46 is configured for selectively coupling the lid 38 to the dish 36. The coupling of the lid 38 and the dish 36 will be explained in greater detail below.

Figure 7:
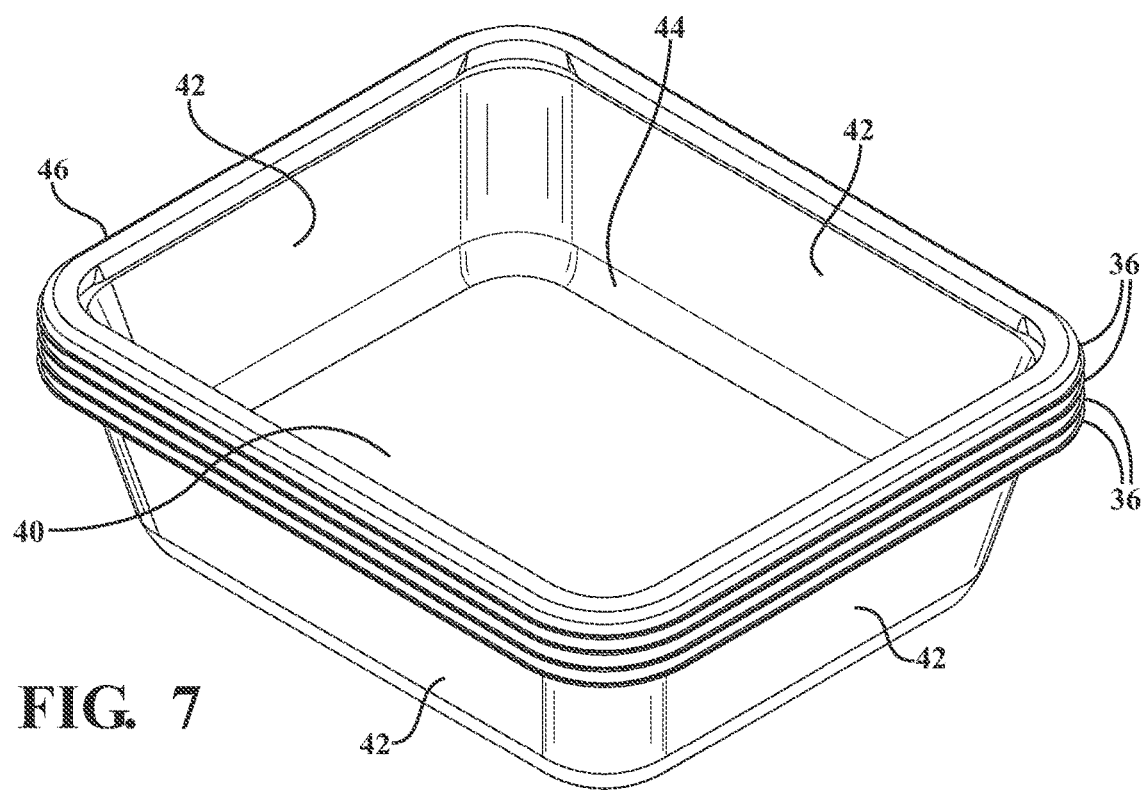
FIG. 7 is a perspective view of several dishes stacked upon each other.

The walls 42 extend transverse to the bottom portion 40. Typically, the walls 42 are angled such that the interior 44 is inwardly tapered toward the bottom portion 40. As such, each dish 36 is capable of being stacked upon another dish 36, as shown in FIG. 7. It is to be appreciated that the walls 42 can extend at any angle without departing from the scope of the present invention. The desired stackable nature of the dish 36 will be better understood through further explanation below.

Figure 4:
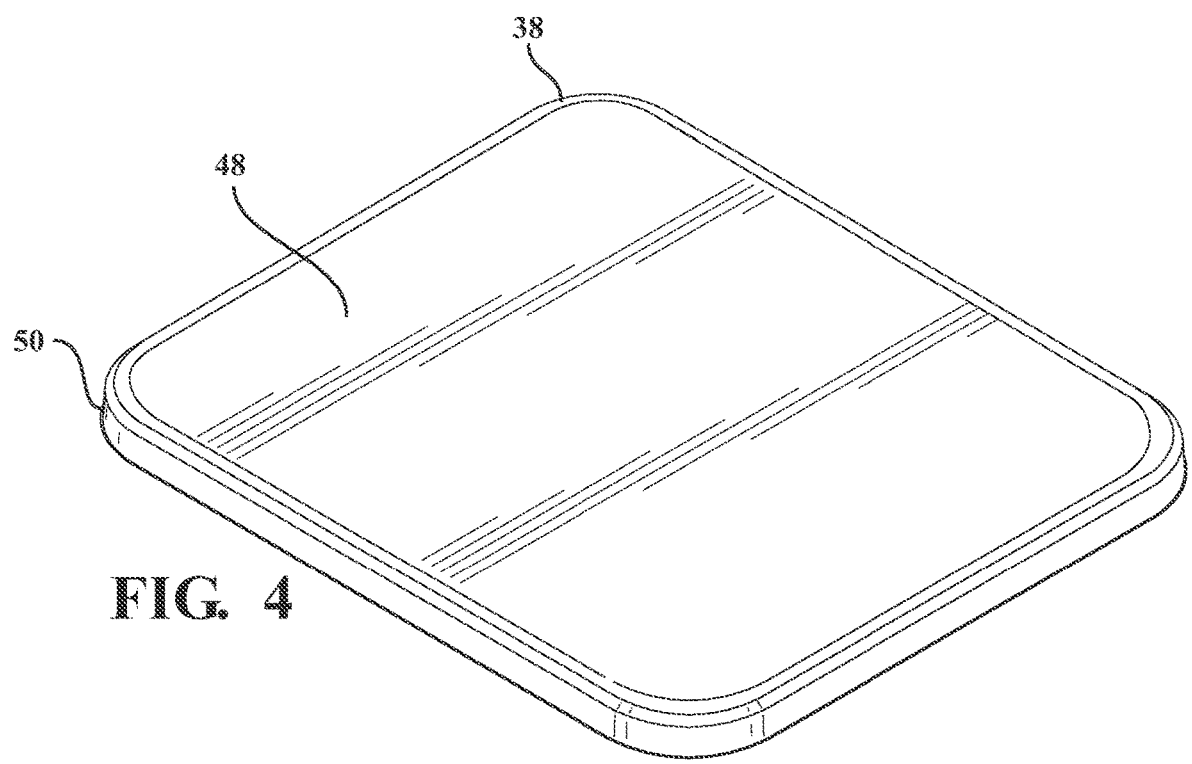
FIG. 4 is a perspective view of a lid.
Figure 5:
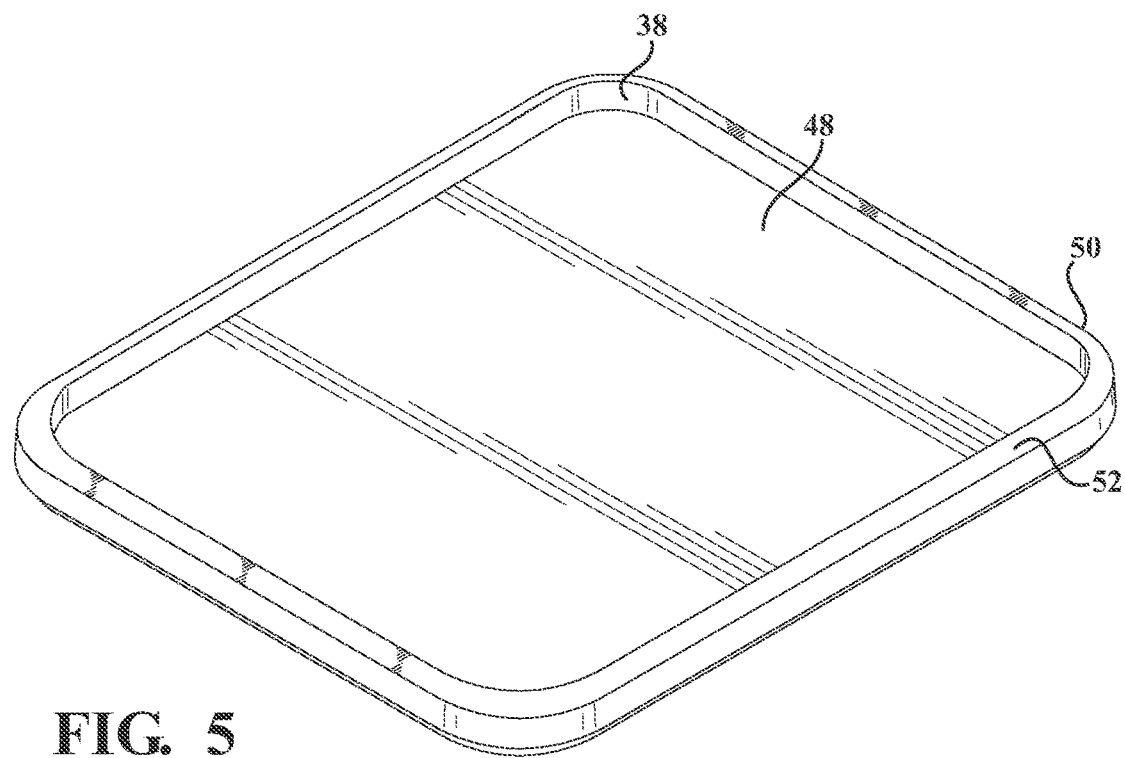
FIG. 5 is a perspective view of a flange defining a channel.

The lid 38 is configured for selectively coupling to the dish 36. As shown in FIG. 4, the lid 38 includes a cover 48 configured to enclose the dish 36 at the distal ends of the walls 42. The lid 38 has a flange 50 extending from the cover 48 with the flange 50 defining a channel 52, as shown in FIG. 5. The channel 52 is configured to selectively accept and retain the lip 46 of the walls 42 of the dish 36. Acceptance of the lip 46 within the channel 52 couples the lid 38 to the dish 36 to store and seal the article within the interior 44 of the dish 36.

Typically, the dish 36 and lid 38 are comprised of a plastic material such as polypropylene. However, it is to be appreciated that the dish 36 and the lid 38 can be any suitable material for storing and sealing an article. It is also to be appreciated that both the lid 38 and the dish 36 can comprise any light transparency from entirely transparent to entirely opaque without departing from the scope of the present invention.

Figure 6:
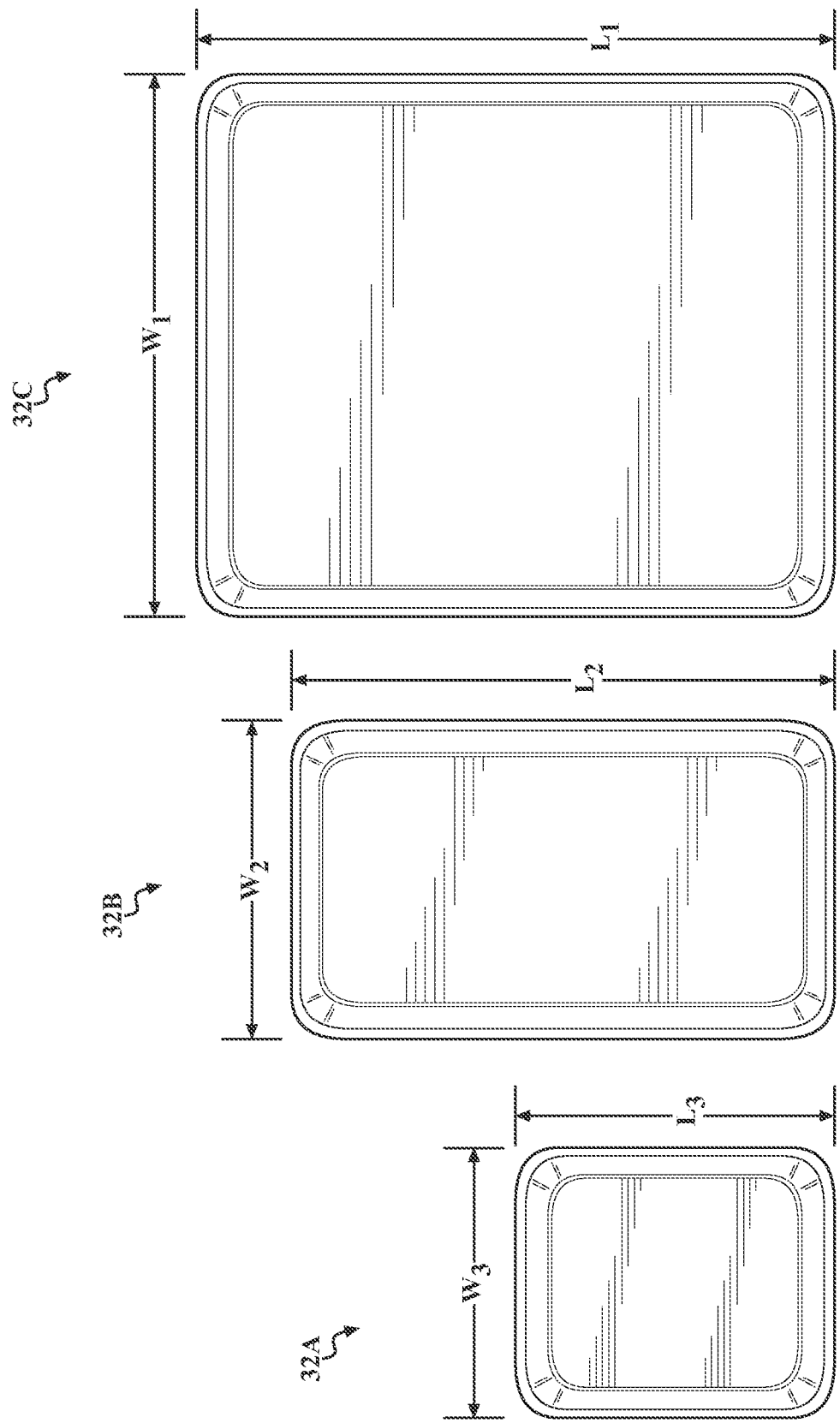
FIG. 6 is a top view of various size and configurations of the storage container.

As shown in FIG. 6, the lids 38 and the dishes 36 have various sizes and configurations for the containers. For example in one embodiment, the container organizer kit 30 includes three configurations of the storage containers 32, a quarter-size configuration 32A, a half-size configuration 32B, and a full-size configuration 32C. Specifically, the full-size configured dish 36 and lid 38 of the full-size configuration 32C each have a first length $L_1$ and a first width $W_1$. The half-size configured dish 36 and lid 38 of the half-size configuration 32B each have a second length $L_2$ and a second width W2 with the second length $L_2$ equal to the first width $W_1$ and the second width W2 equal to half of the of the first length $L_1$. The quarter-size configured dish 36 and lid 38 of the quarter-size configuration 32A each have a third length $L_3$ and a third width W3 with the third length $L_3$ equal to the second width W2 and the third width W3 equal to half of the second length $L_2$. Said differently, the third length $L_3$ is equal to half of the first length $L_1$ and the third width W3 is equal to half of the first width $W_1$. It is to be appreciated that the lids 38 and the dishes 36 can have any size and configuration without departing from the scope of the present invention.

Figure 8:
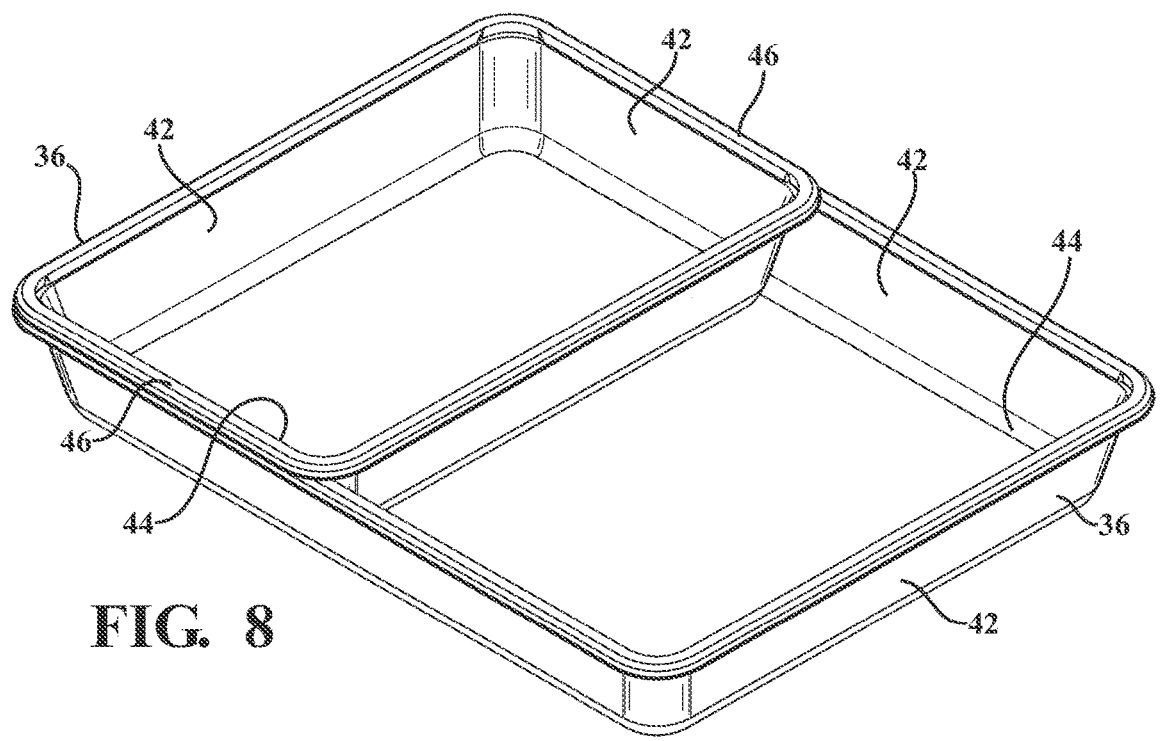
FIG. 8 is a perspective view of a half-size configured dish stacked within a full-size configured dish.
Figure 9:
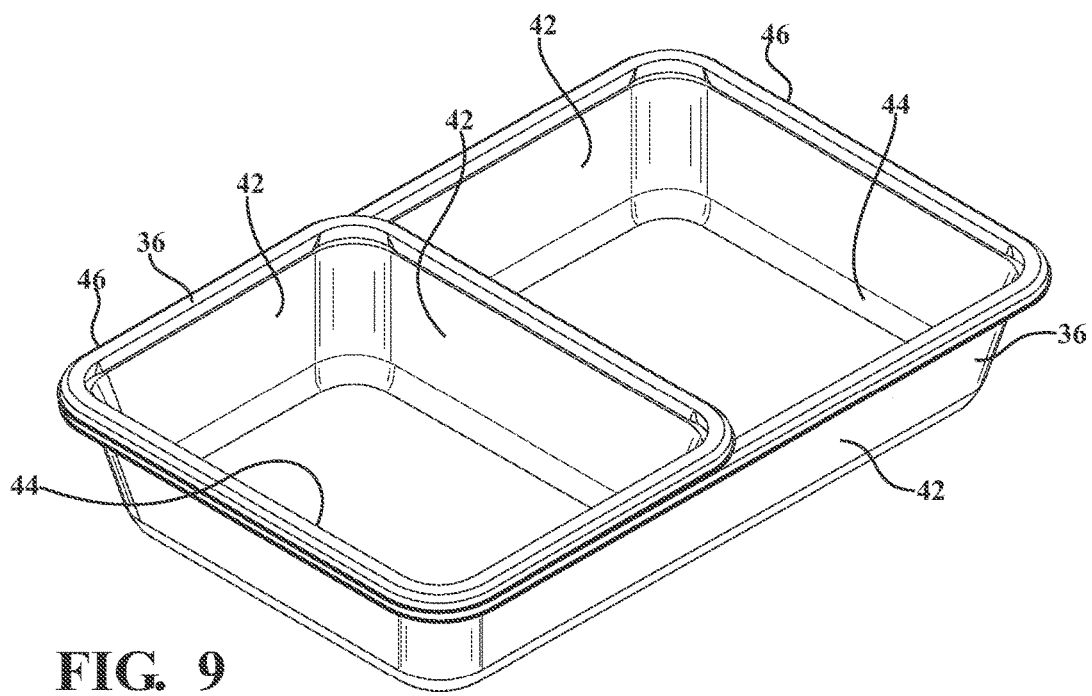
FIG. 9 is a perspective view of a quarter-size configured dish stacked within the half-size configured dish.
Figure 10:
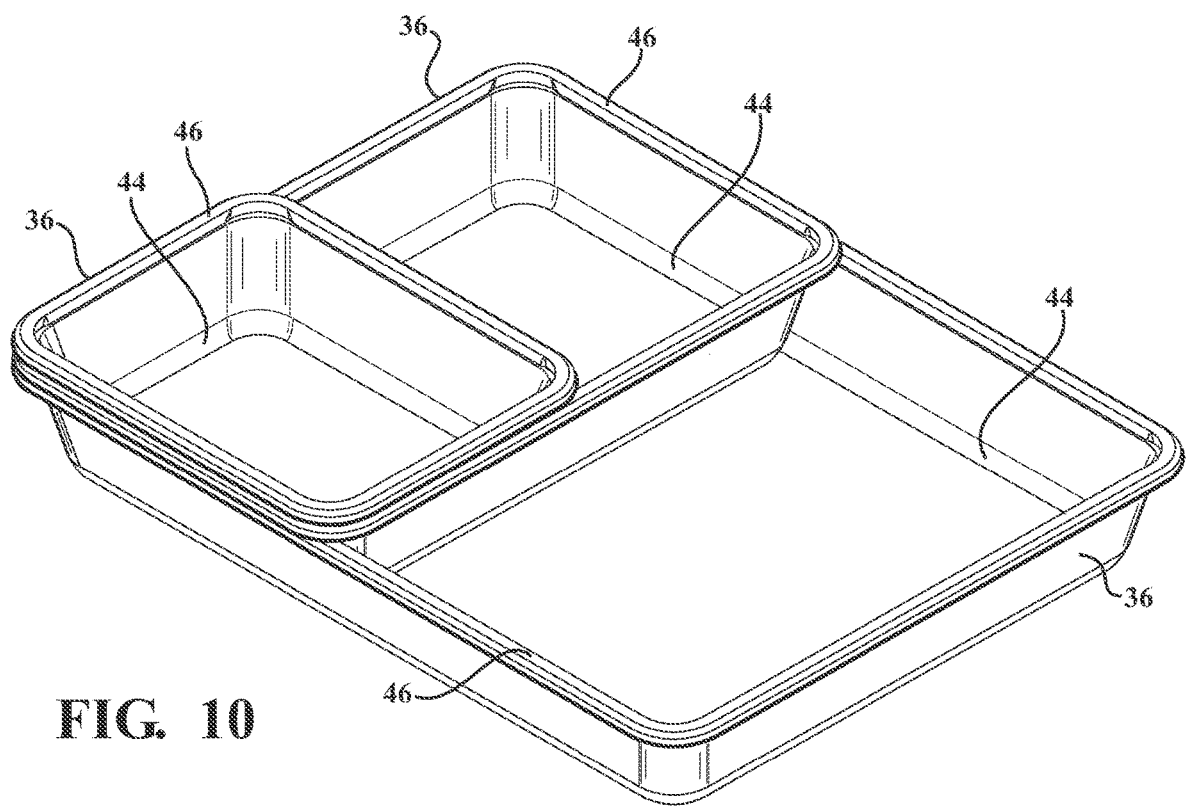
FIG. 10 is a perspective view of the quarter-size configured dish stacked within the half-size configured dish stacked within a full-size configured dish.

As discussed above, each dish 36 is capable of stacking on top of another dish 36, as shown in FIG. 7. More specifically, each like configured dish 36 is capable of being stacked on each other. For example, each full-size configured dish 36 is stackable on each other, each half-size configured dish 36 is stackable on each other, and each quarter-size configured dish 36 is stackable on each other. It is also to be appreciated that dishes 36 configured smaller than other dishes 36 are stackable within dishes 36 of larger configuration. For example, the full-size configured dish 36 is capable of holding up to two separate stacks of half-size configured dishes 36 within the interior 44 of the full-size configured dish 36 as generally illustrated in FIG. 8 which shows one half-size configured dish 36 within the interior 44 of the full-size configured dish 36 with space for a second half-size configured dish 36. As another example, the half-size configured dish 36 is capable of holding up to two separate stacks of quarter-size configured dishes 36 within the interior 44 of the half-size configured dish 36 as generally illustrated in FIG. 9 which shows one quarter-size configured dish 36 within the interior 44 of the half-size configured dish with space for a second quarter-size configured dish 36. As yet another example, the full-size configured dish 36 is capable of holding up to four separate stacks of quarter-size configured dishes 36 within the interior 44 of the full-size configured dish 36. As a further example, the full-size configured dish 36 is capable of holding multiple configurations of dishes 36 within the interior 44 of the full-size configured dish 36, including up to one separate stack of half-size configured dishes 36 and up to two separate stacks of quarter-size configured dishes 36. Additionally, various configured dishes 36 can be stacked in other various configured dishes 36 which are further stacked in other various configured dishes 36. For example, as generally illustrated in FIG. 10, quarter-size configured dishes 36 can be stacked within the half-size configured dishes 36 in varying ways including the examples above. The half-size configured dish 36 can further be stacked in the full-size configured dishes 36 in varying ways including the examples above. It is to be appreciated that the variously configured dishes 36 can be stacked in any manner without departing from the scope of the present invention.

Figure 11:
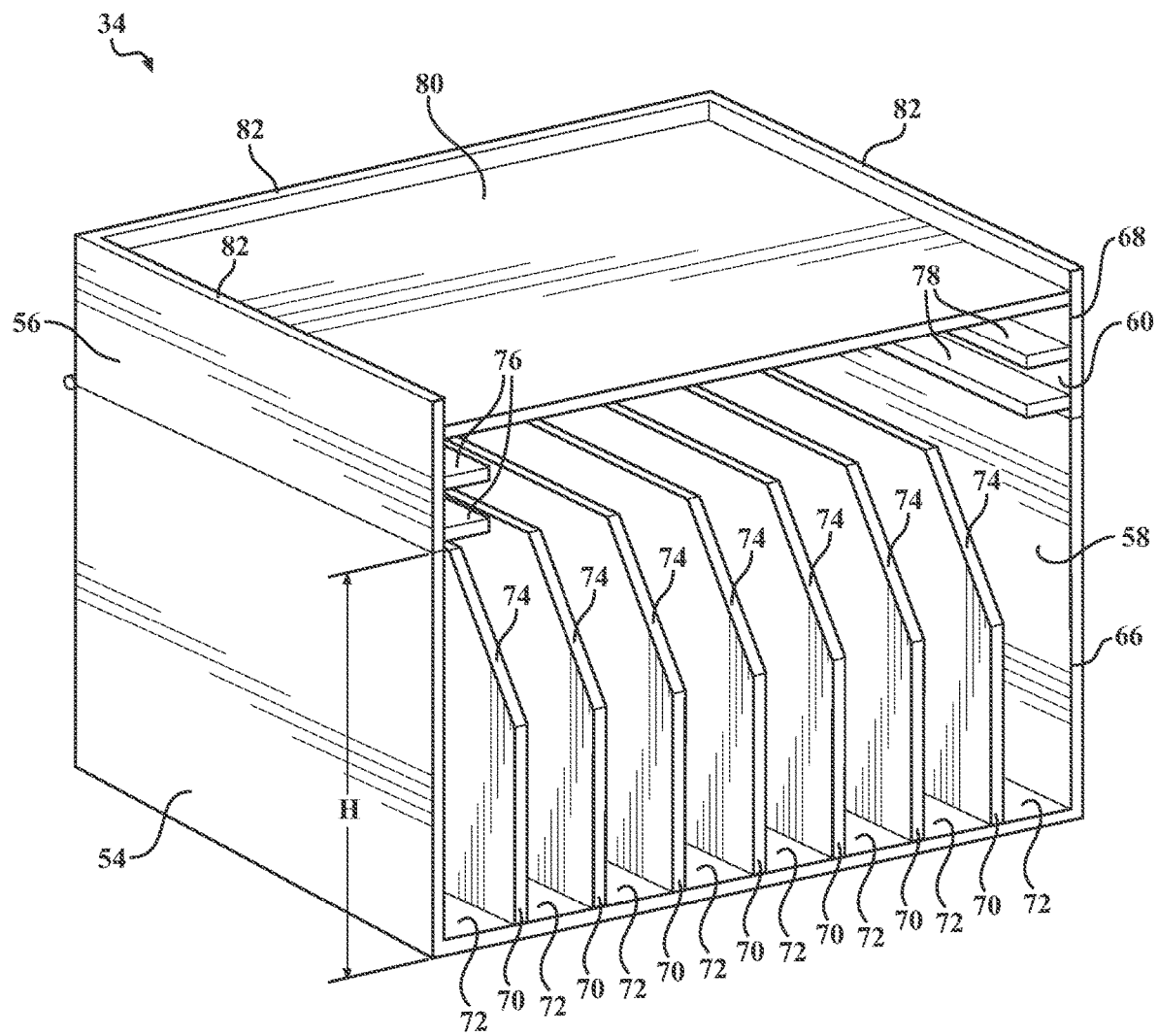
FIG. 11 is a perspective view of a rack in a closed position.
Figure 12:
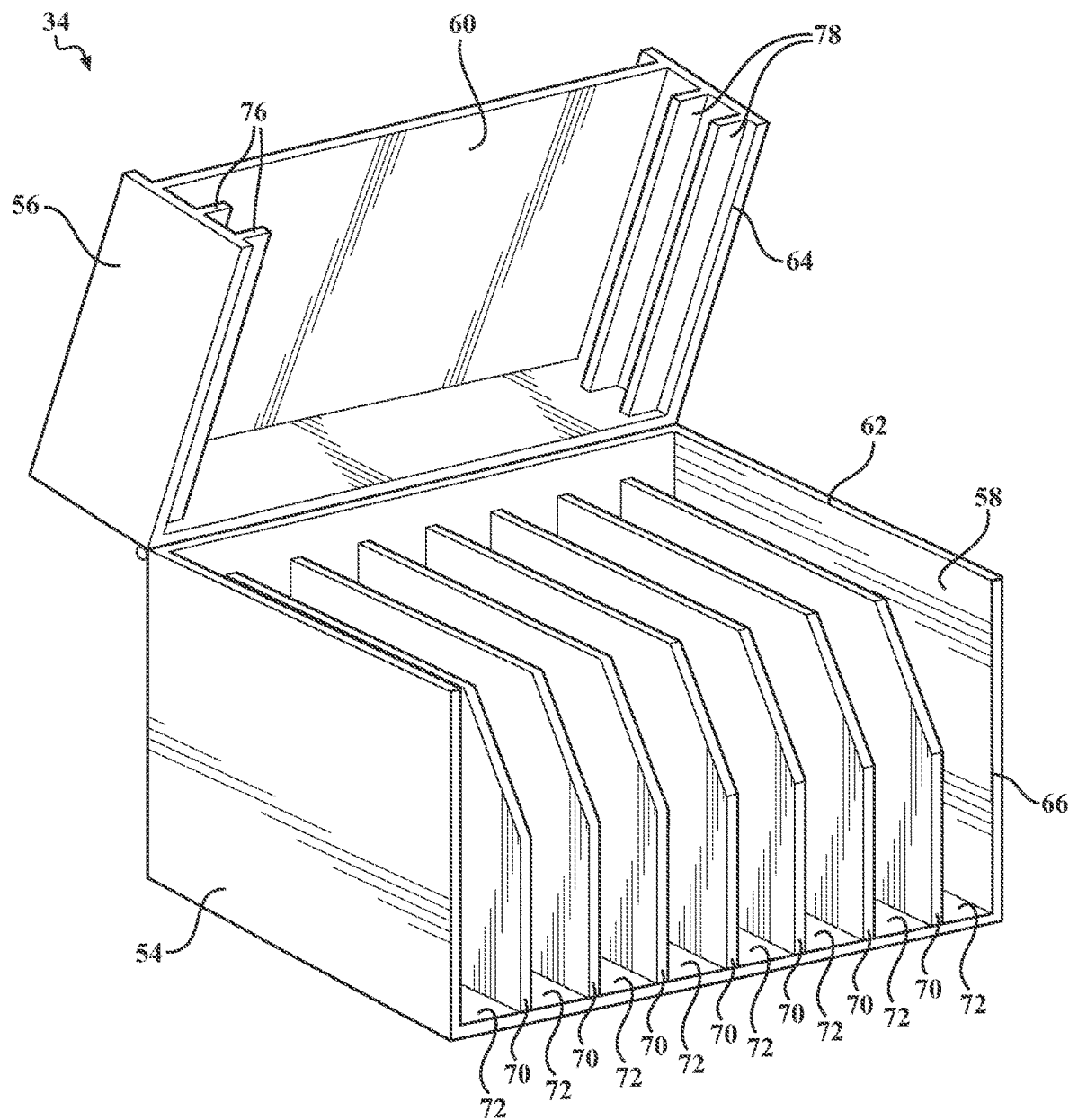
FIG. 12 is a perspective view of the rack in an open position.

As shown in FIG. 11, the rack 34 includes a base 54 and a cap 56 with the base 54 defining a first cavity 58 and the cap 56 defining a second cavity 60. The first and second cavities 58, 60 are disposed adjacent to each other when the cap 56 is in a closed position. Said differently, as shown in FIG. 12, the base 54 defines a top opening 62 providing access into the first cavity 58 and the cap 56 defines a bottom opening 64 providing access into the second cavity 60 with the base 54 and cap 56 abutting each other at the top and bottom openings 62, 64 in the closed position. In other words, the base 54 has a plurality of edges defining a top plane with the top opening 62 disposed along the top plane and the cap 56 has a plurality of edges defining a bottom plane with the bottom opening 64 disposed along the bottom plane. The base 54 defines a first opening 66 providing access into the first cavity 58 transverse to the top opening 62. The cap 56 defines a second opening 68, as shown in FIG. 11, providing access into the second cavity 60 transverse to the bottom opening 64. In other words, the base 54 has a plurality of edges defining a first plane with the first opening 66 disposed along the first plane and the cap 56 has a plurality of edges defining a second plane with the second opening 68 disposed along the second plane. In the closed position, the first and second openings 66, 68 are substantially planar to one another.

The cap 56 has a hinged coupling to the rack 34. Said differently, the cap 56 is coupled to the rack 34 such that cap 56 can pivot between the closed position in which the cap 56 abuts the base 54 at the top and bottom openings 62, 64 such that top and bottom openings 62, 64 are substantially parallel and an open position, as shown in FIG. 12, in which the bottom opening 64 of the cap 56 is spaced from the top opening 62 of the base 54. Said differently, in the open position the cap 56 is pivoted relative to the base 54 such that the top and bottom openings 62, 64 are not substantially parallel. The open and closed positions of the cap 56 will be better understood through further explanation below.

Figure 13:
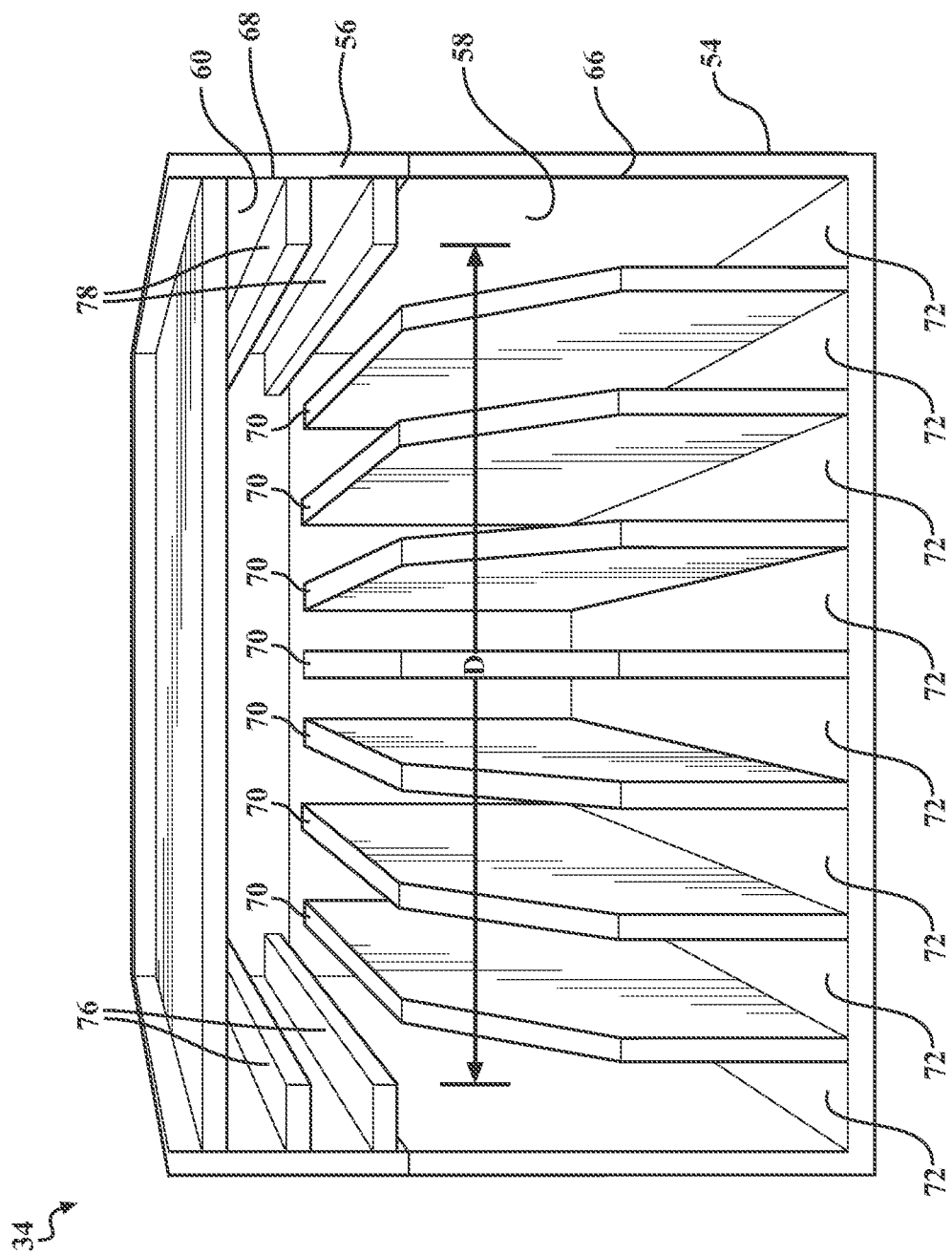
FIG. 13 is a front view of the rack.

As shown in FIGS. 11-13, the base 54 defines a plurality of dividers 70 disposed within the first cavity 58. The dividers 70 are spaced from and extend substantially parallel to each another. Each of the dividers 70 are fixed to the base 54 and extend through the first cavity 58 toward both the first opening 66 and the top opening 62. In an exemplary embodiment, the dividers 70 extend transverse to the top opening 62. The plurality of dividers 70 and the base 54 define a plurality of slots 72 for disposing lids 38 therein. In an exemplary embodiment, dividers 70 are comprised of a solid planar material for defining the plurality of slots 72; however, it is to be appreciated that the divider 70 can be comprised of a plurality of pegs or any other suitable configuration for defining the slots 72 without departing from the scope of the present invention. Furthermore, it is to be appreciated that the dividers 70 can extend substantially parallel to the top opening 62 or be disposed in any other suitable configuration without departing from the scope of the present invention.

Each of the plurality of dividers 70 have a chamfered surface 74 extending angularly between the first opening 66 and the top opening 62, as shown in FIG. 11. The chamfered surfaces 74 are configured such that lids 38 disposed within the slots 72 extend past the chamfered surfaces 74 toward the first opening 66 and the top opening 62. As such the chamfered surfaces 74 facilitate ease of access to the lids 38 disposed within the slots 72.

As shown in FIG. 11-13, the cap 56 defines a plurality of first tabs 76 and a plurality of second tabs 78 disposed within the second cavity 60. The first tabs 76 extend from the cap 56 into the second cavity 60 with the first tabs 76 spaced from and substantially parallel to each other. The second tabs 78 extend from the cap 56 into the second cavity 60 opposite the first tabs 76 with the second tabs 78 spaced from and substantially parallel to each other. Typically, each of the first tabs 76 correspond to one of the second tabs 78 such that one first tabs 76 corresponds to one second tab. Corresponding first and second tabs 76, 78 are planar to one another and are substantially parallel to the bottom opening 64. The first and second tabs 76, 78 are configured such that lids 38 selectively engage corresponding first and second tabs 76, 78 for holding the lid 38 within the second cavity 60. It is to be appreciated that the first and second tabs 76, 78 can be any suitable configuration for holding the lid 38. It is to be further appreciated that the first and second tabs 76, 78 can be interconnected such that corresponding first and second tabs 76, 78 have a wall, a web, or any other suitable configuration disposed between and coupled to each of the first tab 76 and the second tab 78.

As previously discussed, the lids 38 have various configurations. Accordingly, the rack 34 is configured for storing various lid 38 configurations. For example, in the exemplary embodiment, the first and second tabs 76, 78 are disposed opposite one another within the second cavity 60 of the cap, with the first and second tabs 76, 78 having a distance D between them, as shown in FIG. 13. The distance D is less than first length $L_1$ of the full-size configured lid 38 but greater than the second length $L_2$ of the half-size configured lid 38 and the third length $L_3$ of the quarter-size configured lid 38. As such, the first and second tabs 76, 78 are configured for holding the full-size configured lids 38.

The plurality of dividers 70 within the first cavity 58 of the base 54 extend from the base 54 to the top opening 62 at a height H, as shown in FIG. 11. As such, to operatively fit within the slots 72, the lids 38 must be configured such that one of the width and the length that is less than the height H. In the exemplary embodiment, the second width $W_2$ of the half-size configured lids 38 is less than the height H and both the third width $W_3$ and the third length $L_3$ of the quarter-size configured lids 38 are less than the height H. As such, the half-size configured and quarter-size configured lids 38 can be operatively disposed within the slots 72. The first length $L_1$ and the first width $W_1$ of the full-size configured lids 38 are greater than the height H. As such, the full-size configured lid 38 does not operatively fit into the slots 72 with the cap 56 in the closed position. However, there are circumstances in which the full-size configured lid 38 can be disposed within the slots 72 as will be discussed in greater detail below.

The cap 56 includes an upper surface 80 adjacent to the second cavity 60 and substantially parallel to the bottom opening 64. Typically, a plurality of ridges 82 extend away from the cap 56 adjacent the upper surface 80. Said differently, the plurality of ridges 82 substantially surround the upper surface 80 such that the plurality of ridges 82 extend along three of the four sides of the upper surface 80. The ridges 82 do not extend from the cap 56 adjacent and planar to the second opening 68, which will be become apparent as it is explained in greater detail below. The upper surface 80 is configured to support the at least one dish 36. Multiple dishes 36 can be stacked on top of one another on the upper surface 80 in exemplary configurations described above or in any other suitable configuration. The plurality of ridges 82 are configured to hold the dishes 36 on the upper surface 80.

Typically, the dishes 36 are capable of sliding on the upper surface 80 to facilitate proper positioning of the dishes 36. The plurality of ridges 82 selectively engage the dishes 36 to prevent the dishes 36 from sliding off of the upper surface 80.

As mentioned above, the container organizer kit 30 can be utilized in the cupboard. In the orientation shown in FIG. 1, when disposed in the cupboard, the container organizer kit 30 is typically oriented with the first and second openings 66, 68 facing outwardly from the cupboard. Such orientation facilitates access to the first and second cavities 58, 60. Typically, the cap 56 is positioned in the closed position. As described above, the ridges 82 do not extend from the cap 56 adjacent and planar to the second opening 68. As a result, the upper surface 80 can be easily and desirably be accessed. Such configuration facilitates the ease of which the dishes 36 can slide onto and off of the upper surface 80. The ease of access to the first and second cavities 58, 60 allow lids 38 to be inserted and withdrawn from the first and second cavities 58, 60.

Figure 14:
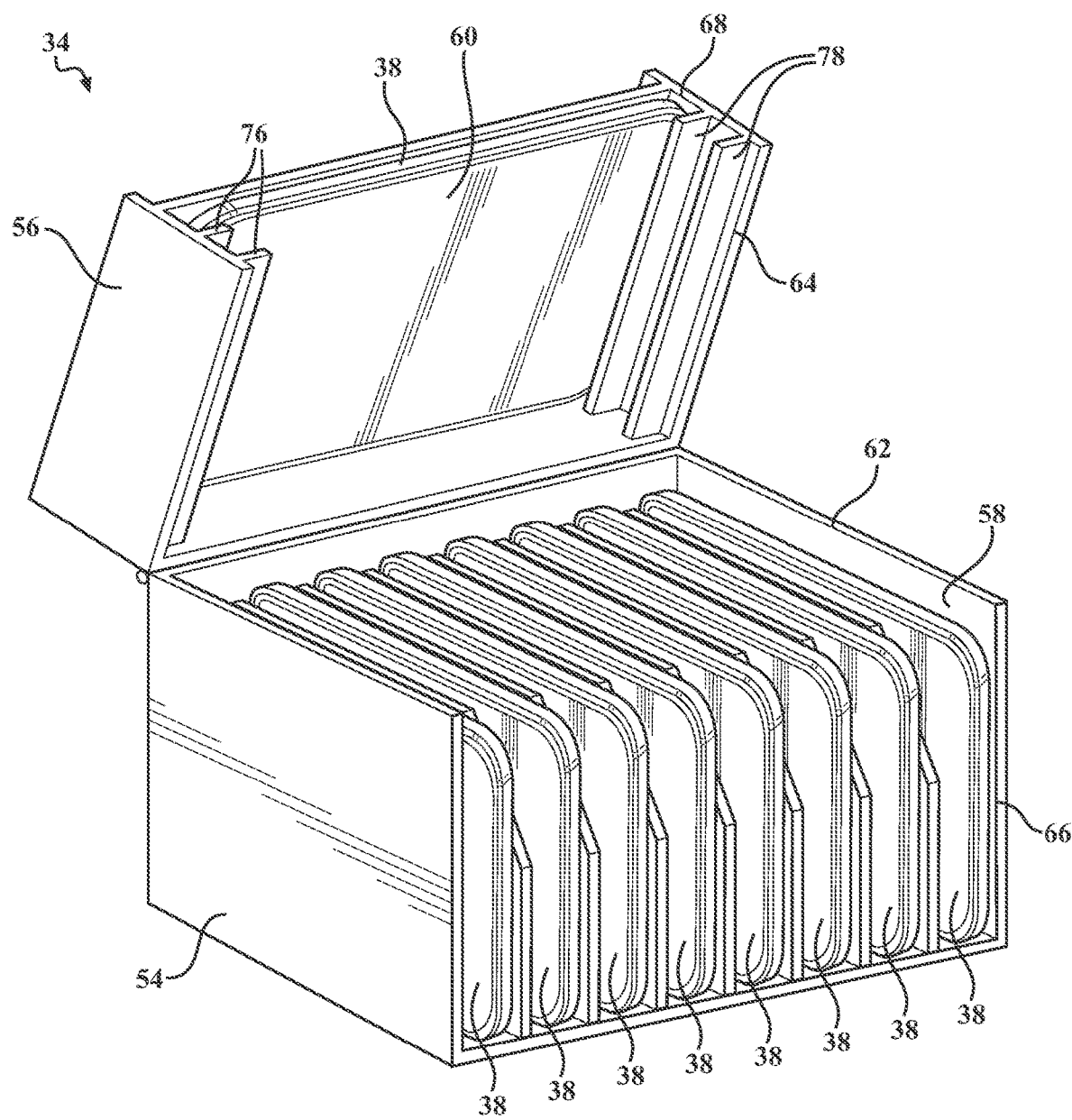
FIG. 14 is a perspective view of the rack in the open position with the lids disposed in the rack.
Figure 15:
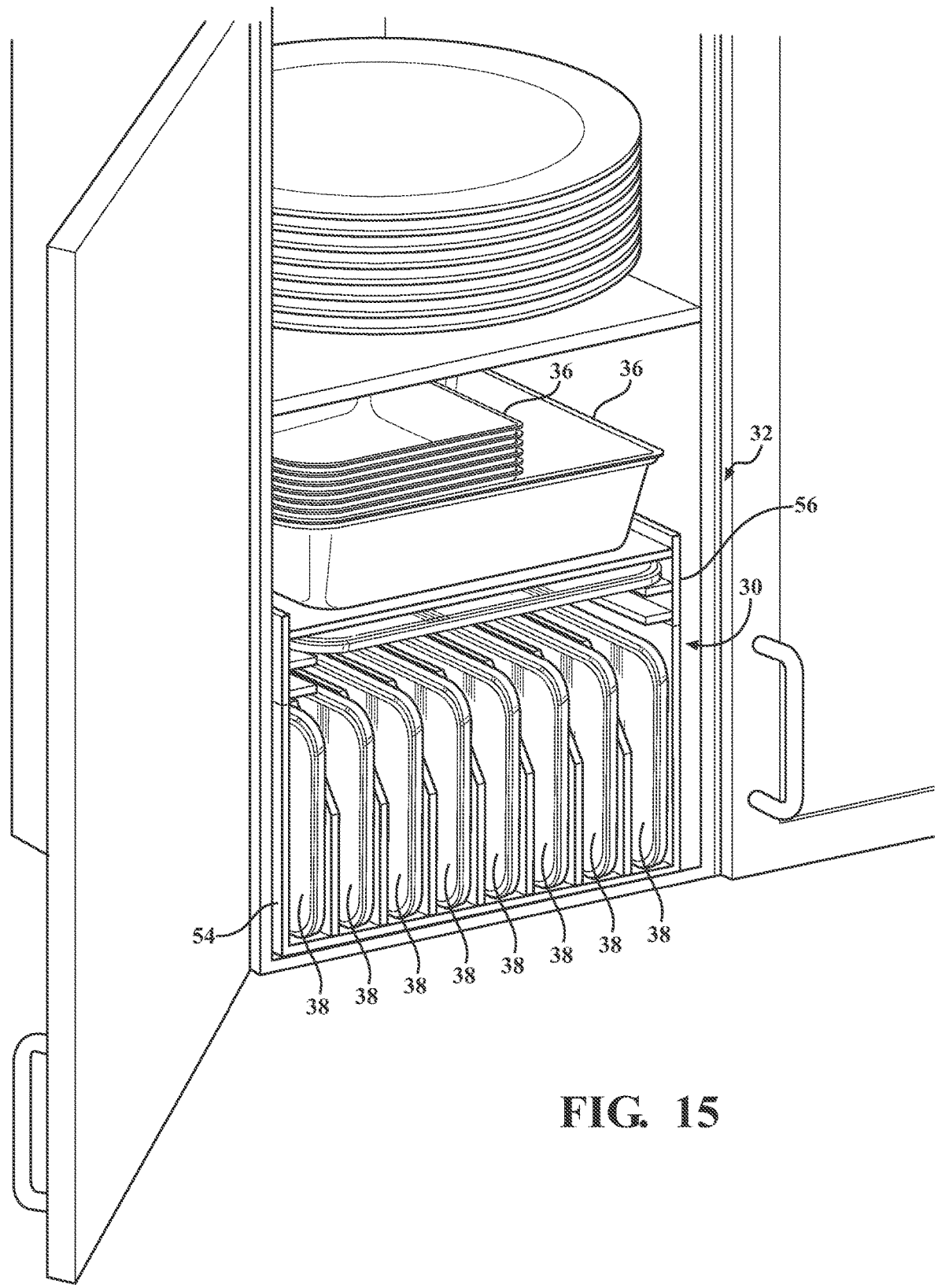
FIG. 15 is a perspective view of the rack in the closed position and being placed in a cabinet.
Figure 16:
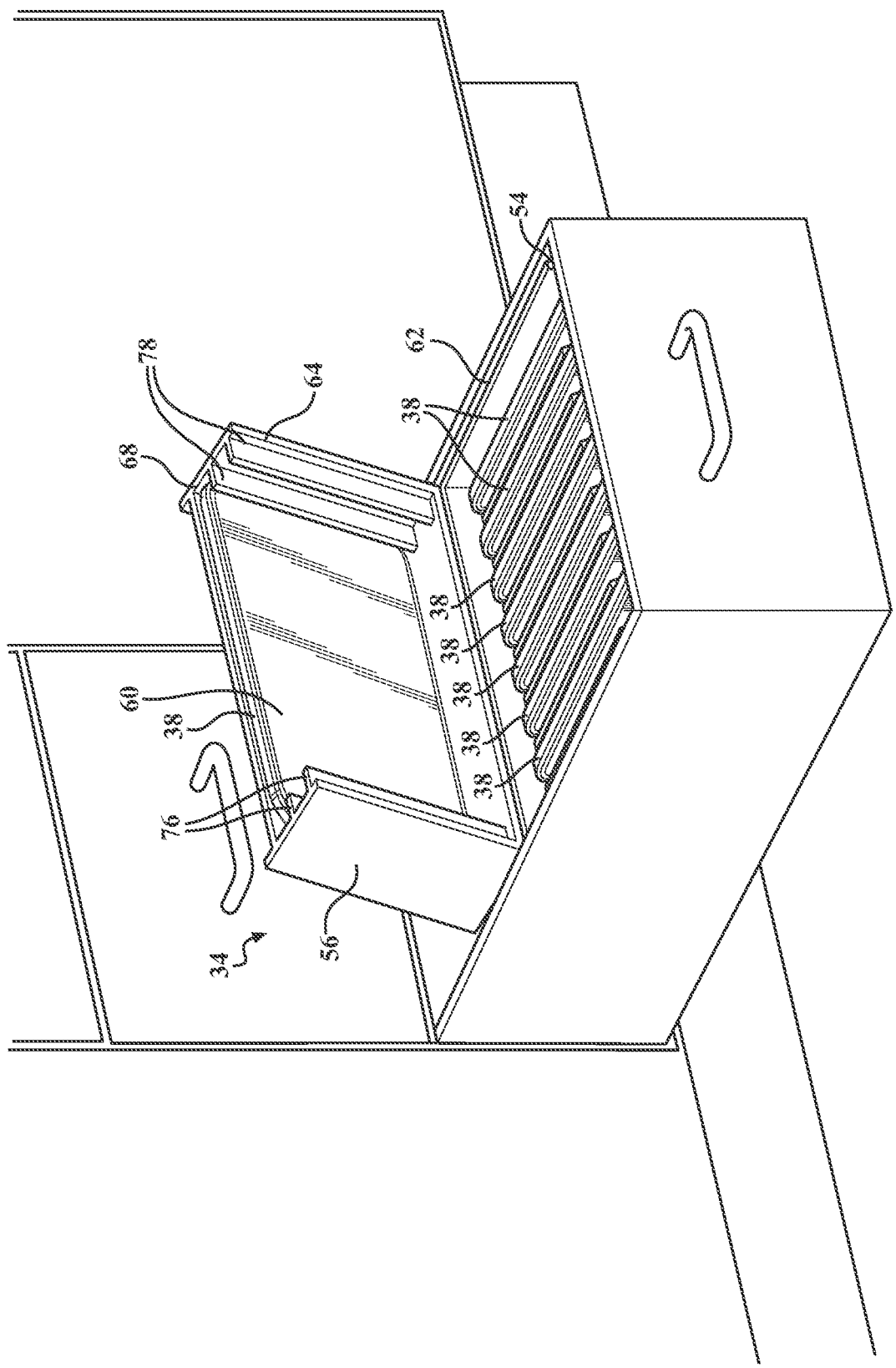
FIG. 16 is a perspective view of the rack in the open position and being placed in a drawer.
Figure 17:
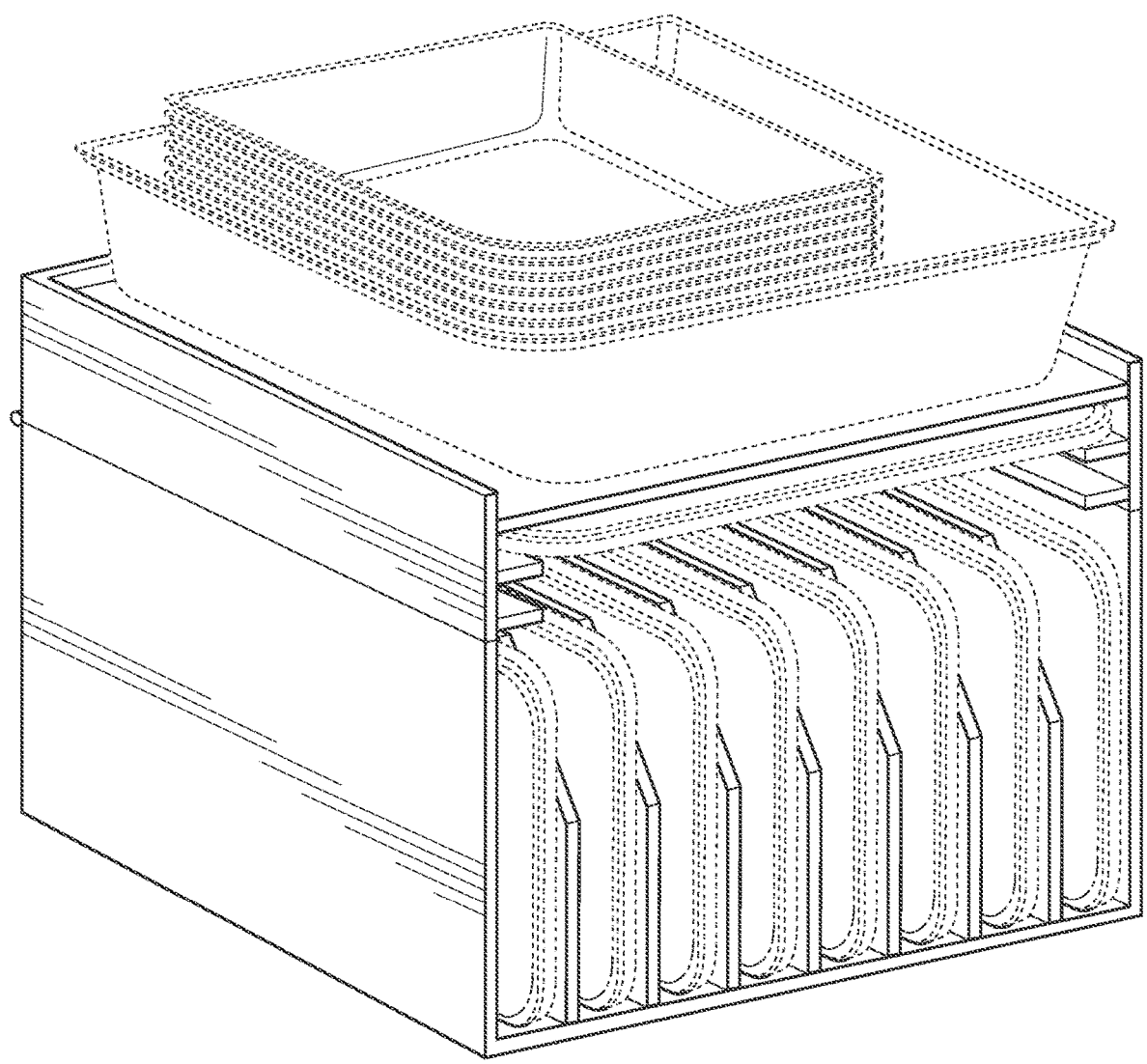
FIG. 17 is a perspective view of the rack with container lids and dishes being shown in phantom using dashed lines.
Figure 18:
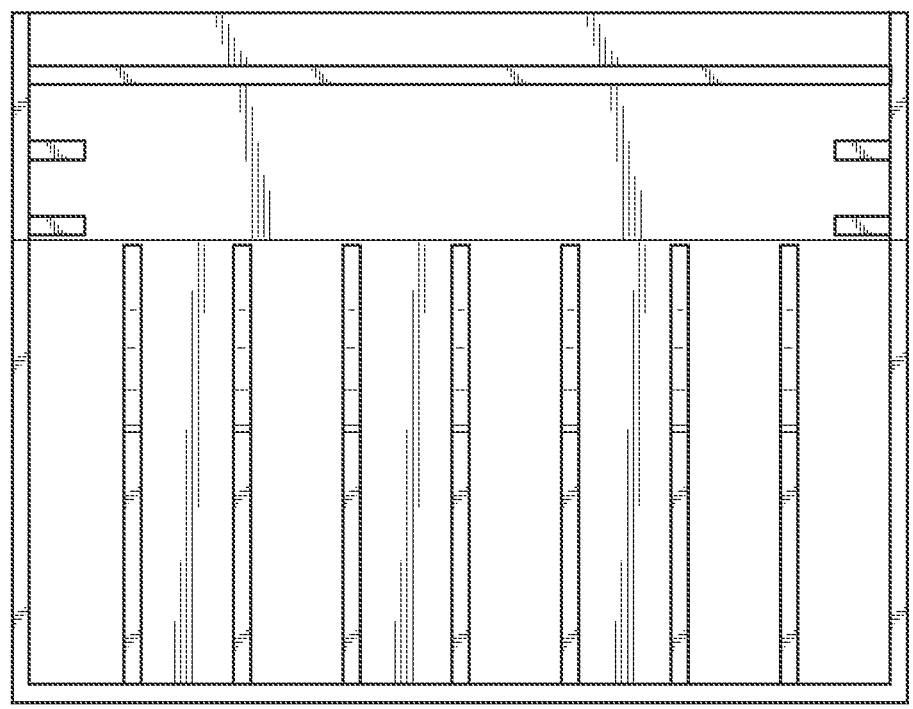
FIG. 18 is a front view of the rack.
Figure 19:
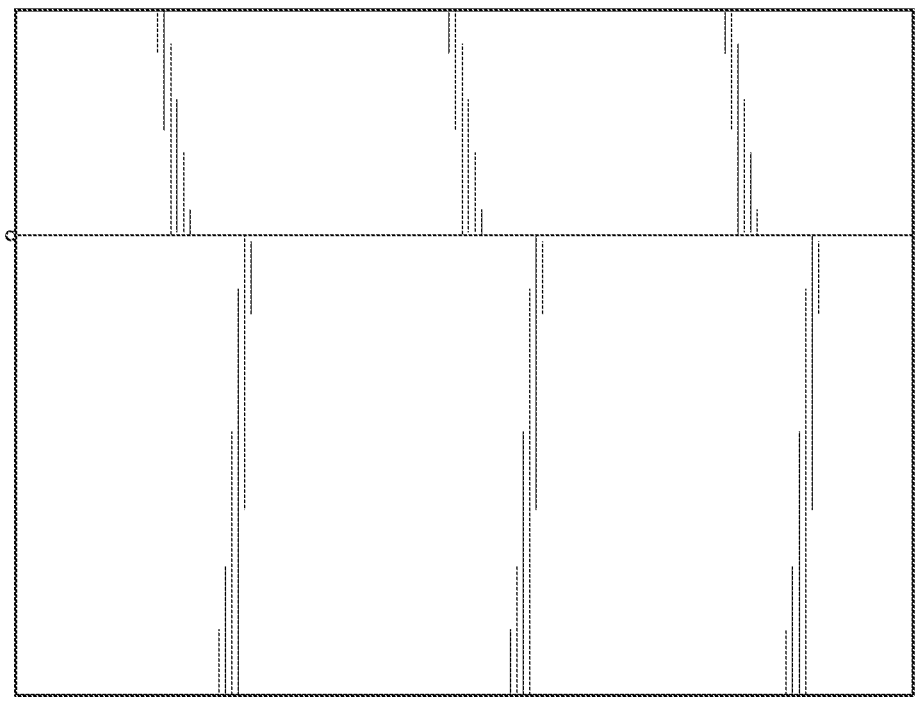
FIG. 19 is a left view of the rack.
Figure 20:
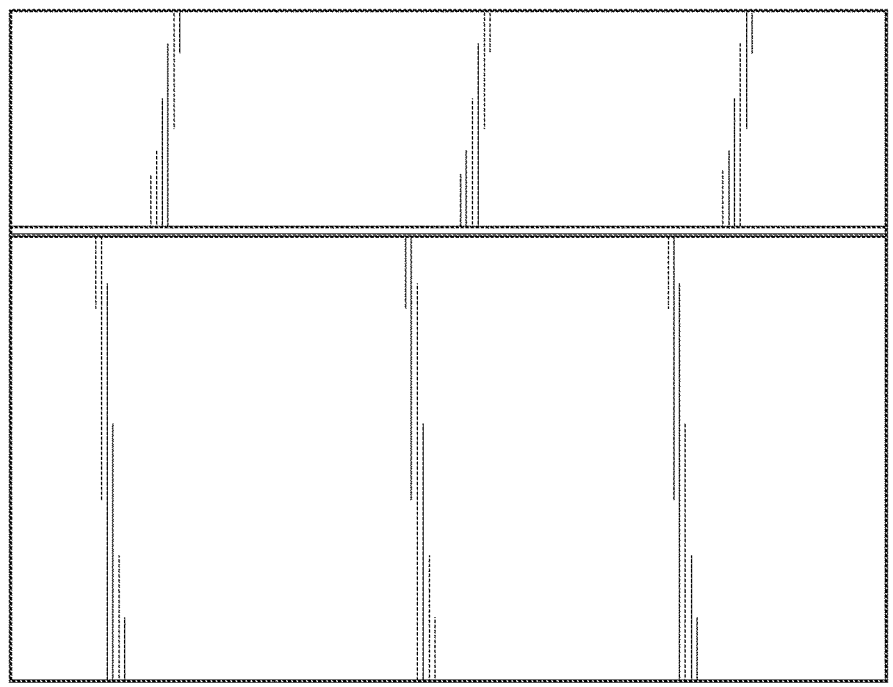
FIG. 20 is a back view of the rack.
Figure 21:
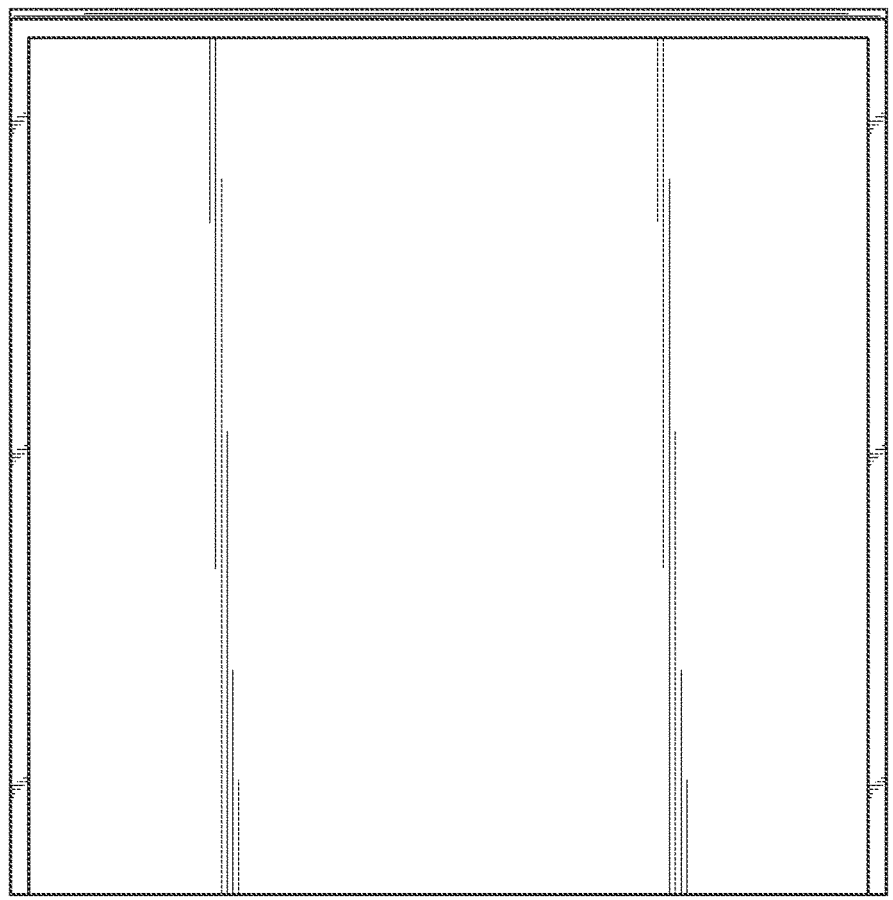
FIG. 21 is a top view of the rack.
Figure 22:
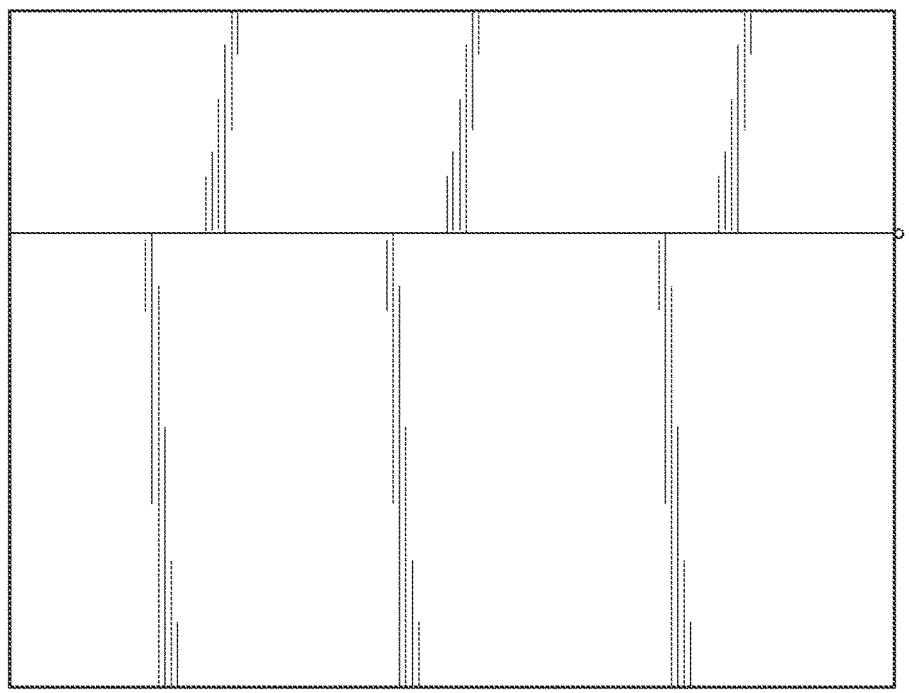
FIG. 22 is a right view of the rack.
Figure 23:
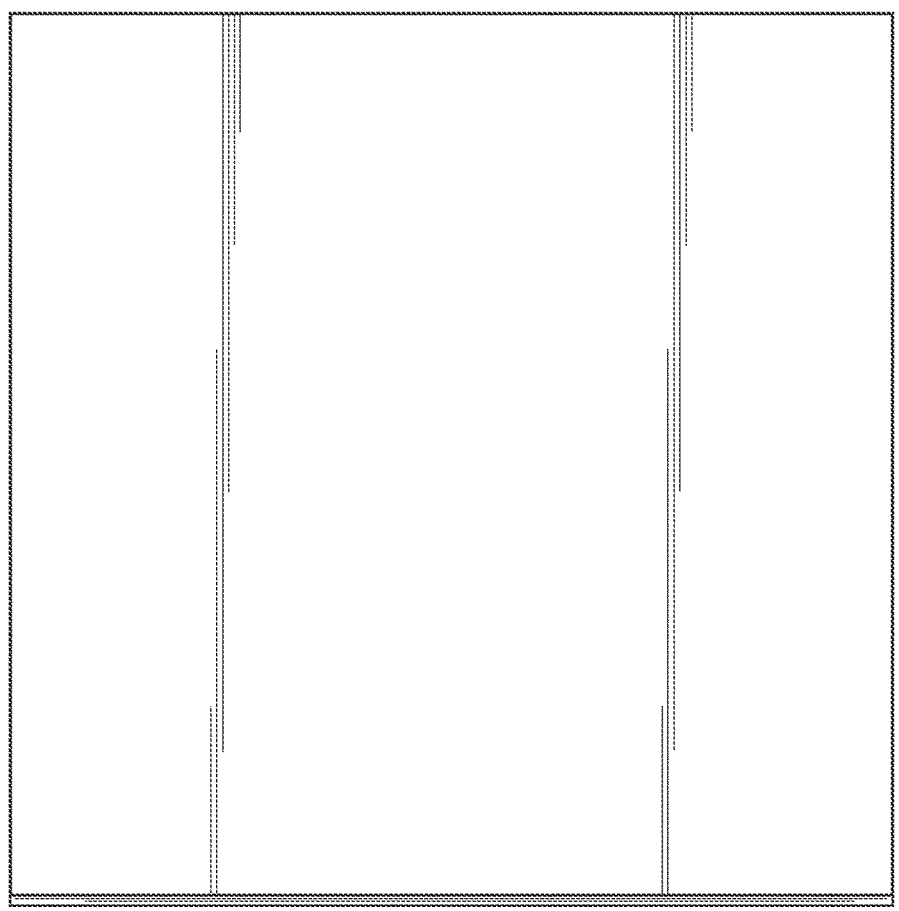
FIG. 23 is a bottom view of the rack.

As also mentioned above, and illustrated in FIG. 16, the container organizer kit 30 can be utilized in the drawer. The drawer typically has an outer face and a drawer opening for accessing the drawer. When disposed in the drawer, the container organizer kit 30 is typically oriented with the first and second openings 66, 68 facing the outer face of the drawer and the upper surface 80 facing the drawer opening. With the cap 56 in the closed position the first and second openings 66, 68 are not easily accessible. To access the first and second cavities 58, 60, the cap 56 is pivoted from the closed position, as shown in FIG. 1, to the open position, as shown in FIG. 14. In the open position, the second opening 68 of the cap 56 faces the drawer opening, facilitating access to the second cavity 60 through the second opening 68. Likewise, in the open position the top opening 62 of the base 54 faces the drawer opening, facilitating access to the first cavity 58 through the top opening 62. The lids 38 are placed in the first and second cavities 58, 60. The cap 56 is then moved from the open to the closed position in which the dishes 36 can be placed upon the upper surface 80.

As discussed above, typically the slots 72 of the base 54 are configured for accepting the half-size configured and quarter-size configured dishes 36. However, it is to be appreciated that with the cap 56 in the open position the slots 72 can accept lids 38 of larger configuration than the half-size configuration. As an example, in the open position the full-size configured lid 38 can be inserted into the first cavity 58 such that the lid 38 is partially disposed in one of the slots 72 and extends through one or both of the first opening 66 and top opening 62. It is to be appreciated that with the cap 56 in the open position the slots 72 of the base 54 can accept any configuration of the lid 38 including, but not limited to, the configurations described above.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:
1. A container organizer comprising:
a base defining a cavity for storing first container lids and defining first and second openings providing access to the cavity with the first and second openings being noncoplanar and the first container lids being received by and removed from the cavity through the first and second openings; and
a cap moveably coupled to the base between a first position in which the cap covers the second opening and a second position in which the cap is separated from the second opening,
wherein the base and cap are configured to be positioned in a drawer and provide access to the cavity through the second opening without the base being removed from the drawer.

2. The container organizer of claim 1, wherein the cap does not prevent the first container lids from being received by and removed from the cavity through the first opening.

3. The container organizer of claim 1, wherein the cap is pivotally coupled to the base to move between the first position and the second position.

4. The container organizer of claim 1, wherein the first opening is substantially perpendicular to the second opening.

5. The container organizer of claim 1, wherein the cavity is defined as a first cavity, and the cap defines a second cavity for storing second container lids and a third opening with the second container lids being received by and removed from the second cavity through the third opening.

6. The container organizer of claim 5, wherein the third opening is adjacent to and substantially coplanar with the first opening when the cap is in the first position, and is separated from first opening when the cap is in the second position.

7. The container organizer of claim 5, wherein the cap defines a fourth opening providing access to the second cavity, the fourth opening being adjacent and substantially parallel to the second opening when the cap is in the first position, and being separated from the second opening when the cap is in the second position.

8. The container organizer of claim 7, wherein the fourth opening is substantially perpendicular to the third opening.

9. The container organizer of claim 5, wherein the first cavity holds the first container lids in a vertical orientation, and the second cavity holds the second container lids in a horizontal orientation.

10. The container organizer of claim 9, wherein the base comprises a bottom interior surface and a plurality of first dividers disposed within the first cavity that each extends from the bottom interior surface to the second opening to hold the first container lids in the vertical orientation, and the cap comprises a plurality of second dividers disposed within the second cavity that are substantially parallel to the second opening to hold the second container lids in the horizontal orientation.

11. The container organizer of claim 10, wherein the base comprises a back interior surface intersecting the bottom interior surface, and the first dividers each extends from the back interior surface to the first opening within the first cavity.

12. The container organizer of claim 11, wherein the first dividers each includes a chamfered surface extending angularly between the first opening and the second opening.

13. The container organizer of claim 10, wherein the second dividers comprise a plurality of first tabs and a plurality of second tabs opposite the first tabs, each of the first tabs being substantially coplanar with one of the second tabs.

14. The container organizer of claim 10, wherein the second dividers define one or more horizontal slots, and the height of each first divider is less than the width of each of the one or more horizontal slots.

15. The container organizer of claim 1, wherein the cap includes an upper exterior surface substantially parallel to the second opening when the cap is in the first position for supporting a plurality of container dishes, and includes a ridge that extends upwards from a perimeter of the upper exterior surface.

16. The container organizer of claim 15, wherein the perimeter of the upper exterior surface comprises a portion from which the ridge does not extend.

17. A container organizer kit comprising:
   a plurality of first container lids;
   a plurality of second container lids larger than the first container lids; and
   a container organizer comprising:
      a base portion defining a first cavity for storing the first container lids and a first opening providing access to the first cavity with the first container lids being received by and removed from the first cavity through the first opening, the base portion including a plurality of vertical dividers disposed within the first cavity that hold the first container lids in a vertical orientation; and
      a cap portion positioned above the base portion, the cap portion defining a second cavity for storing the second container lids and a second opening coplanar with the first opening and providing access to the second cavity with the second container lids being received by and removed from the second cavity through the second opening, the cap portion including a plurality of horizontal dividers that hold the second container lids in a horizontal orientation,
   wherein the cap portion and the base portion define a third cavity that includes the first cavity and the second cavity.

18. A method of using a container organizer including a base defining a first cavity for storing first container lids and defining first and second openings providing access to the first cavity with the first and second openings being noncoplanar, and including a cap coupled to the base, the method comprising the steps of:
   inserting one of the first container lids into the first cavity through the first opening when the cap is in a first position in which the cap covers the second opening;
   opening a drawer;
   placing the container organizer having the one of the first container lids in the first cavity into the drawer so that the first opening faces laterally and the cap faces upwards;
   moving the cap from the first position to a second position in which the cap is separated from second opening while the container organizer is in the drawer;
   retrieving the one of the first container lids from the first cavity through the second opening when the cap is in the second position while the container organizer is in the drawer;
   moving the cap from the second position to the first position; and
   closing the drawer.

19. The method of claim 18, wherein the cap defines a second cavity for storing second container lids and a third opening providing access to the second cavity that is coplanar with the first opening when the cap is in the first position, and comprising the steps of:
   inserting one of the second container lids into the second cavity through the third opening when the cap is in the first position; and
   retrieving the one of the second container lids from the second cavity through the third opening when the cap is in the second position while the container organizer is in the drawer.

* * * * *